(12) United States Patent
Coutant et al.

(10) Patent No.: US 12,585,030 B2
(45) Date of Patent: Mar. 24, 2026

(54) METHOD AND DEVICE FOR DETERMINING GEOGRAPHIC POSITIONS OF A GEOGRAPHIC LOCATION TRACKER

(71) Applicant: Orange, Issy-les-Moulineaux (FR)

(72) Inventors: Stéphane Coutant, Chatillon (FR); Jérôme De Murcia, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 524 days.

(21) Appl. No.: 17/928,082

(22) PCT Filed: May 21, 2021

(86) PCT No.: PCT/FR2021/050935
§ 371 (c)(1),
(2) Date: Nov. 28, 2022

(87) PCT Pub. No.: WO2021/240102
PCT Pub. Date: Dec. 2, 2021

(65) Prior Publication Data
US 2023/0305171 A1 Sep. 28, 2023

(30) Foreign Application Priority Data
May 28, 2020 (FR) ...................................... 2005630

(51) Int. Cl.
*G01S 19/42* (2010.01)
*G01S 19/34* (2010.01)
(Continued)

(52) U.S. Cl.
CPC .............. *G01S 19/42* (2013.01); *G01S 19/34* (2013.01); *G01S 19/09* (2013.01); *G01S 19/14* (2013.01); *G01S 19/40* (2013.01)

(58) Field of Classification Search
CPC .......... G01S 19/40; G01S 19/42; G01S 19/34; G01S 19/38; G01S 19/14; G01S 19/09
(Continued)

(56) References Cited

U.S. PATENT DOCUMENTS 8,223,068 B2 7/2012 Allan et al.
9,261,599 B1 2/2016 Golden et al.
(Continued)

FOREIGN PATENT DOCUMENTS

KR 20250107476 A * 7/2025 ............. G01S 19/48

OTHER PUBLICATIONS

K. Aftab et al. "Generalized Weiszfeld Algorithms for Lq Optimization" published in the journal 10 IEEE Transactions on Pattern Analysis and Machine Intelligence (vol. 37, Issue: 4, Apr. 1, 2015).
(Continued)

*Primary Examiner* — Chuong P Nguyen
(74) *Attorney, Agent, or Firm* — Brian D. Kaul; Westman, Champlin & Koehler, P.A.

(57) ABSTRACT

A method for a sequence of geographic location measurements of a tracer. The method includes: obtaining the sequence, ordered as a function of time of measurement; for an indexed measurement of the sequence, partitioning all the measurements in two ordered sets, the indexed measurement being either the last measurement of the first set or the first measurement of the second set; calculating statistical data for the first and second sets; calculating a distance between the sets as a function of a distance between the statistical data of the sets; determining a maximum distance among the distances for the set; the statistical datum of the first set defined for the indexed measurement associated with the maximum difference corresponding to a first position of the tracer and the statistical datum of the second set defined for
(Continued)

the indexed measurement associated with the maximum distance corresponding to a second position of the tracer.

13 Claims, 5 Drawing Sheets

(51) Int. Cl.

| | | |
|---|---|---|
| G01S 19/09 | (2010.01) | |
| G01S 19/14 | (2010.01) | |
| G01S 19/40 | (2010.01) | |

(58) Field of Classification Search
USPC ........... 342/357.23, 357.25, 357.21, 357.46, 342/357.52, 357.74
See application file for complete search history.

(56) References Cited

U.S. PATENT DOCUMENTS

| | | | | |
|---|---|---|---|---|
| 9,766,349 | B1 | 9/2017 | Madhow et al. | |
| 12,105,177 | B2 * | 10/2024 | Alves | H04W 4/029 |
| 12,253,612 | B2 * | 3/2025 | Perahia | G01S 19/50 |
| 2007/0018811 | A1 * | 1/2007 | Gollu | G06Q 10/087 |
| | | | | 340/8.1 |
| 2020/0278453 | A1 * | 9/2020 | Levy | G01S 19/37 |
| 2023/0136500 | A1 * | 5/2023 | Perahia | G01S 19/46 |
| | | | | 455/456.1 |

OTHER PUBLICATIONS

Nguyen Dinh Thuan et al., "A Novel Design of Low Power Consumption GPS Positioning Solution Based on Snapshot Technique" 2017 International Conference on Advanced Technologies for Communication (ATC), IEEE, Oct. 18, 2017 (Oct. 18, 2017), pp. 285-290, XP033263282.
Manuel Eichelberger et al., "Multi-Year GPS Tacking Using a Coin Cell" Mobile Computing Systems and Application, ACM, 2 Penn Plaza, Suite 701 New York, NY 10121-0701 USA, Feb. 22, 2019 (Feb. 22, 2019), pp. 11-146, XP058427335.
International Search Report dated Sep. 15, 2021 for corresponding International Application No. PCT/FR2021/050935, filed May 21, 2021.
Written Opinion of the International Searching Authority dated Sep. 15, 2021 for corresponding International Application No. PCT/FR2021/050935, filed May 21, 2021.
English translation of the Written Opinion of the International Searching Authority dated Sep. 29, 2021 for corresponding International Application No. PCT/FR2021/050935, filed May 21, 2021.

* cited by examiner

| SQ | | | | | | | |
|---|---|---|---|---|---|---|---|
| M1 | M2 | | | | ⋮ | Mn | |
| Q1 | Q2 | | | | ⋮ | Qn | |
| t1 | t2 | | | | ⋮ | tn | |

| | | | | | | | | |
|---|---|---|---|---|---|---|---|---|
| $E1_1$ | $E2_1$ | $E1_2$ | $E2_2$ | | | ⋮ | $E1_n$ | $E2_n$ |
| $Med1_1$ | $Med2_1$ | $Med1_2$ | $Med2_2$ | | | ⋮ | $Med1_n$ | $Med2_n$ |
| $CQ1_1$ | $CQ2_1$ | $CQ1_2$ | $CQ2_2$ | | | ⋮ | $CQ1_n$ | $CQ2_n$ |

| Dj | | | | |
|---|---|---|---|---|
| D1 | D2 | | ⋮ | Dn |

METHOD AND DEVICE FOR DETERMINING GEOGRAPHIC POSITIONS OF A GEOGRAPHIC LOCATION TRACKER

CROSS-REFERENCE TO RELATED APPLICATIONS

This Application is a Section 371 National Stage Application of International Application No. PCT/FR2021/050935, filed May 21, 2021, which is incorporated herein by reference in its entirety and published as WO 2021/240102 A1 on Dec. 2, 2021, not in English.

PRIOR ART

The invention relates to the general field of GNSS (for "Global Navigation Satellite System") geographical location, for example GPS (for "Global Positioning System") or else Galileo geographical location. It is applied preferably, but without limitation, to the geographical location of a geographical position tracker having low energy consumption.

Position trackers with low energy consumption are generally used to track objects that are often stationary, such as items of luggage or cargo containers. These trackers have a low-power cell or battery. Such a tracker picks up a GNSS signal to determine its location or geographical position, and is able to display and/or send information about the determined location to a server.

According to the prior art, to save the energy of a GNSS tracker, the GNSS location functionality often operates intermittently, measuring the GNSS signal at times that are spaced from one another, and not continuously. The GNSS location measurements (called a "fix") may thus be of poor quality, in particular when the tracker is placed in a location where the GNSS signal is weak.

One solution is known for achieving a more precise location while still complying with the requirement of low consumption of the tracker. This solution consists in a server post-processing the location measurements performed by the GNSS tracker. U.S. Pat. Nos. 8,223,068B2 and 9,261,599B1 propose such post-processing methods. These post-processing methods from the prior art are based on an assumption that the tracker is static. However, the tracker may be moved from time to time. These methods from the prior art therefore do not make it possible to locate the tracker with precision.

There is therefore a need for a solution that improves the post-processing methods from the prior art in order to obtain better precision of the location of the tracker, and therefore of a tracked object, while still maintaining low energy consumption of the tracker.

DISCLOSURE OF THE INVENTION

The invention targets a method for determining geographical positions of a geographical location tracker, the method being implemented by a device for a sequence of measurements of the geographical location of the tracker, the sequence being ordered according to a measurement time of the measurements, the method comprising the following steps:

obtaining the sequence;

for a measurement of the sequence, called "indexed measurement", partitioning all of the measurements into two ordered sets, the indexed measurement being either the last measurement of the first set or the first measurement of the second set;

computing a statistical datum for the first set;

computing a statistical datum for the second set;

computing a distance associated with the indexed measurement, between the two sets, on the basis of a distance between the statistical data of these sets;

determining a maximum distance from among the distances computed for all of the indexed measurements of the sequence:

the statistical datum of the first set defined for the indexed measurement associated with the maximum distance corresponding to a first position of the tracker and the statistical datum of the second set defined for the indexed measurement associated with the maximum distance corresponding to a second position of the tracker.

In correlation, the invention targets a device for determining geographical positions of a geographical location tracker, the device comprising:

a module for obtaining a sequence, configured to obtain a sequence of measurements of the geographical location of the tracker, the sequence being ordered according to a measurement time of the measurements;

a processing module, configured, for a measurement of the sequence, called "indexed measurement", to partition all of the measurements into two ordered sets, the indexed measurement being either the last measurement of the first set or the first measurement of the second set;

compute a statistical datum for the first set;

compute a statistical datum for the second set;

compute a distance, associated with the indexed measurement, between the two sets on the basis of a distance between the statistical data of these sets;

a comparison module configured to determine a maximum distance from among the distances computed for all of the indexed measurements of the sequence;

the processing module being configured to determine that the statistical datum of the first set defined for the indexed measurement associated with the maximum distance corresponds to a first position of the tracker and the statistical datum of the second set defined for the indexed measurement associated with the maximum distance corresponds to a second position of the tracker.

The features and advantages of the proposed method that are presented below apply in the same way to the proposed device, and vice versa.

The proposed device is a device for post-processing GNSS location measurements, making it possible to improve the precision of the location of the starting and finishing positions of the tracker after each movement.

One application of interest of the proposed method is when the tracker often remains static, for example for 90% of the time. The movements of the tracker are infrequent, for example two to three times per month. The tracker may be collocated for example with an item of luggage or a container.

In one particular embodiment, the tracker is a tracker with low energy consumption. This geographical location tracker may be incorporated into the tracked object, joined or fixed thereto.

In one particular embodiment, a geographical location measurement is a set of GNSS coordinates for defining a geographical position of the tracker. It is common to use the term "fix" to denote a GNSS geographical location measurement. The GNSS coordinates of the tracker may be for example latitude, longitude and altitude relative to a given level such as mean sea level.

The determination method proposes to distribute a sequence of GNSS measurements into subsequences that correspond to positions occupied by the sensor (the tracker) before and after a movement.

In one embodiment, the proposed method furthermore comprises the following steps:

comparing between the maximum distance and a threshold;

if the maximum distance is greater than or equal to the threshold, dividing the sequence into two subsequences corresponding to the first and second sets of the indexed measurement associated with the maximum distance; and implementing this method for each of said subsequences as a sequence.

In one embodiment of the proposed device, the comparison module is furthermore configured to compare the maximum distance with a threshold; the proposed device furthermore comprises:

a division module configured, if the maximum distance is greater than or equal to the threshold, to divide the sequence into two subsequences corresponding to the first and second sets of the indexed measurement associated with the maximum distance; and send each of said subsequences to the obtaining module so that it obtains them as sequences.

In one embodiment, the proposed method is implemented until all of the maximum distances determined for all of the subsequences are below the threshold, the statistical data of the subsequences obtained at the end of the last iteration correspond to the starting and finishing positions of the tracker following each movement.

This embodiment allows better precision in determining the starting and finishing positions of the tracker during movement thereof. The tracker has been moved as many times as the number of subsequences obtained following the last iteration of implementing the method minus 1. For example, if the number of subsequences is equal to 2, the tracker has been moved once; the first subsequence corresponds to its starting position and the second subsequence corresponds to its finishing position. If the number of subsequences is equal to n, the tracker has been moved $n-1$ times.

What is thus proposed is a method that is easy to implement on a determination device and that allows precise location of the tracker even on the basis of a limited number of GNSS measurements.

The proposed technique makes it possible to comply with the requirement of low energy consumption of the one or more geographical location trackers. The GNSS functionality may be activated on the tracker in a discontinuous manner.

In one embodiment, if the maximum distance is associated with multiple indexed measurements of the sequence, one of these indexed measurements is selected arbitrarily for the potential division of the sequence into two subsequences.

In one particular embodiment, the steps of computing statistical data for the sets and of computing a distance between the sets are implemented for each of the measurements of the sequence, as an indexed measurement.

In one particular embodiment, the step of obtaining the sequence of measurements comprises at least receiving a said measurement from the location tracker.

In particular, the proposed device and the location tracker may communicate with one another via a LoRa (for "Long Range") network in order to allow the measurements to be transmitted to the server. It will be recalled that a network supporting the LoRa protocol is dedicated to the communication of IoT ("Internet of Things") objects. The LoRa network consumes little energy because it carries only a limited amount of data at the same time. LoRa connected objects have a high degree of autonomy; they may for example be powered by a battery for a period of 2 to 3 years without the need for any particular maintenance. This makes it possible to ensure low energy consumption of the tracker.

As an alternative, the proposed device may obtain the sequence of measurements following configuration thereof by a user or by downloading it from another device.

According to the invention, each statistical datum associated with a set represents a geographical position, in other words a set of GNSS coordinates such as a latitude, a longitude and an altitude. The statistical data of the first and the second set are of the same kind.

In one particular embodiment, the statistical data associated with the sets are the geometric medians of these sets. It will be recalled that a geometric median of a set is the point that minimizes the sum of the distances between this point and the elements of the set. A geometric median of a set of measurements is therefore a geographical position that minimizes the distances between itself and the GNSS positions defined by the measurements of this set.

This embodiment makes it possible to obtain a value that represents a centered location from among the measurements of the set. The geometric median of a set may be determined using a method from the prior art, for example using a gradient descent algorithm, such as the one proposed by the mathematician Weiszfeld.

In another embodiment, the statistical datum of a set is equal to the mean of its elements. It corresponds to a position whose latitude, longitude and altitude are, respectively, the mean latitude, the mean longitude and the mean altitude of the GNSS measurements of the set.

In one particular embodiment, the distance between a first and a second set is equal to the distance between the statistical data of these sets, for example between the geometric medians of these sets.

In one particular embodiment, the step of obtaining the sequence furthermore comprises obtaining, for at least some measurements of the sequence, reliability coefficients of these measurements. The determination method furthermore comprises, for each indexed measurement of the sequence and for each of the first and second sets corresponding to the indexed measurement, a step of computing a quality coefficient associated with the statistical datum of the set, on the basis of the number of measurements of the set and on the basis of the reliability coefficients of the measurements of the set, the distance between said first and second sets being computed taking into account the quality coefficients associated with their statistical data.

This embodiment makes it possible to take into account the quality of the measurements, and thus to give more weight to better-quality GNSS measurements in order to locate the tracker. Indeed, for each of the indexed measurements, the distance between the first and second sets is computed on the basis of the distance between the statistical data of these sets while taking into account the quality coefficients of these data. The maximum distance that will be held for a potential division of the sequence thus takes these factors into account.

According to this embodiment, the more GNSS measurements the set comprises, the better the quality coefficient of its statistical datum. Indeed, the geographical location of the tracker is more reliable when the server has more GNSS measurements.

According to this embodiment, the quality coefficient of the statistical datum of a set reflects the reliability coefficients of the GNSS measurements of this set. The more reliable the GNSS measurements, the better the quality coefficient of the statistical datum.

In one embodiment, a measurement Mj is weighted by a weighting coefficient wj expressed by: [Math. 1]

$$w_j = e^{\frac{-Q_j}{K}}$$

where j is an integer (index) that varies between 1 and the number of measurements of a sequence, Qj is the reliability coefficient of a measurement Mj, and K is a constant, Qj and K being expressed in meters.

In one embodiment, the quality coefficient of a statistical datum of a set, denoted CQ, is expressed by [Math. 2]:

$$CQ = \sqrt{\frac{\sum_j Q_j^2 \times e^{-2Q_j/K}}{\left(\sum_j e^{-Q_j/K}\right)^2}}$$

where j is an integer (index) that varies between 1 and the number of measurements of the set, Qj is the reliability coefficient of a measurement Mj, and K is a constant, Qj and K being expressed in meters.

In one particular embodiment, the method furthermore comprises a step of displaying, on a map, a circle whose center is the statistical datum of a said set, and whose radius is the quality coefficient (CQ) associated with the statistical datum.

This embodiment allows a user to graphically visualize areas where the tracker is present. The smaller the radius of the circle, the better the quality of the statistical datum of the set. Ideally, if the circle is a point, it may be determined that the tracker was located at this point. On the contrary, for a circle with a larger radius, it may be determined that the tracker is located in the geographical area surrounded by the circle, but without greater precision.

The distance associated with an indexed measurement is displayed on the map by the distance between the two circles corresponding to the first and the second set. The maximum distance that is taken into account for a potential division of the sequence of measurements is the one that allows a greater spacing between the circles representing the first and second sets associated therewith.

In one embodiment, the distance between a first and a second set is equal to the distance between the statistical data of these sets, that is to say, on the map, the distance between the centers of the two circles.

In one embodiment, the distance between a first and a second set is equal to the distance between the statistical data of these sets, minus the quality coefficients associated with each of the statistical data. This embodiment makes it possible to take into consideration the distance separating the ends of the two sets closest to one another. On the map, this distance corresponds to the distance between the edges of the circles representing the sets.

In one embodiment, the statistical datum of a set is weighted on the basis of the reliability coefficients of the measurements of this set, the weighted statistical datum being computed by applying Weiszfeld's algorithm.

This embodiment makes it possible to determine the statistical datum by favoring better-quality measurements over the other measurements of the set. In particular, when the statistical datum is the geometric median of the set, this weighted datum is a position that minimizes the distances between itself and the positions corresponding to the better-quality GNSS measurements.

This embodiment makes it possible to rely on the better-quality GNSS measurements compared to the other measurements, and thus to improve the precision of the geographical location of the tracker and of its positions before and after each movement.

In one embodiment, the distance between a first and a second set is equal to the distance between the weighted statistical data of these sets, minus the quality coefficients associated with each of the weighted statistical data.

In one embodiment of the invention, the measurements of the sequence are timestamped.

The timestamp makes it possible to determine a time interval during which the tracker was moved, and thus to provide an estimate of the time of movement of the tracker. In particular, it may be determined, at the end of the iterations of implementing the proposed method, that the tracker was moved between a time corresponding to a statistical datum of a first subsequence and a time corresponding to a statistical datum of a second subsequence.

The invention also targets a system for determining geographical positions of a geographical location tracker. The system comprises a device according to the invention, as described above, and the geographical location tracker, the tracker being configured to send geographical location measurements to the proposed device for the post-processing of these measurements.

In one embodiment, the tracker of the proposed determination system comprises an accelerometer, the tracker being configured to increase a frequency of sending of the measurements upon detection of the activation of the accelerometer, the latter indicating a potential start of movement of the tracker. The sequence will thus comprise more measurements taken while the tracker is moving, which will make it possible to improve the precision of the determined geographical positions.

The invention also targets a computer program on a recording medium, this program being able to be implemented in a computer or in a determination device as described above, this program comprising instructions designed to implement a method for determining geographical positions of a tracker as described above.

This program may use any programming language and be in the form of machine code, source code, object code or intermediate code between source code and object code, such as in a partially compiled form, or in any other desirable form.

In particular, this program may be executed by a microcontroller μC.

The invention also targets computer-readable information or recording media comprising instructions of the computer program as mentioned above.

The information or recording media may be any entity or device capable of storing the programs. For example, the media may comprise a storage means, such as a ROM, for example a CD-ROM or a microelectronic circuit ROM, or else a magnetic recording means, for example a floppy disk or a hard disk, or a flash memory.

Moreover, the information or recording media may be transmissible media such as an electrical or optical signal, which may be routed via an electrical or optical cable, by radio link, by wireless optical link or by other means.

The program according to the invention may in particular be downloaded from a network such as the Internet.

As an alternative, each information or recording medium may be an integrated circuit in which the program is incorporated, the circuit being designed to execute or to be used in the execution of the method for determining geographical positions of a tracker according to the invention.

BRIEF DESCRIPTION OF THE DRAWINGS

Other features and advantages of the present invention will emerge from the description given below, with reference to the appended drawings that illustrate one exemplary embodiment thereof that is in no way limiting. In the figures:

FIG. 3 illustrates content of a memory of a device for determining geographical positions of a tracker according to one particular embodiment;

DETAILED DESCRIPTION OF PARTICULAR EMBODIMENTS

Figure 1:
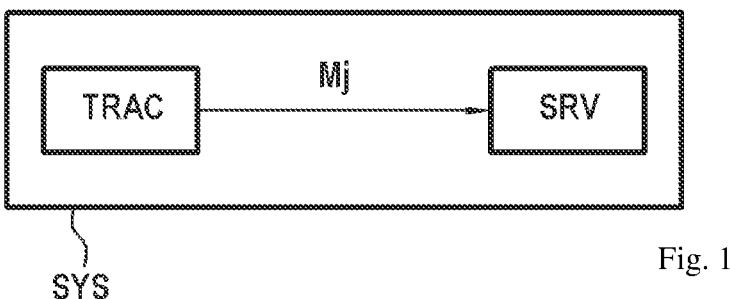
FIG. 1 illustrates a functional architecture of a system for determining geographical positions of a tracker according to one particular embodiment.

FIG. 1 illustrates a functional architecture of a system SYS for determining geographical positions of a tracker according to one particular embodiment. The system SYS comprises a geographical position determination device SRV and at least one geographical location tracker TRAC.

The tracker TRAC is configured to send location measurements Mj to the determination device SRV for post-processing thereof, that is to say processing thereof after these measurements have been taken. The tracker may be collocated with an object, for example incorporated into it.

In the embodiment described here, the device SRV is a server. In particular, the server SRV may be configured to process the measurements of multiple trackers. As an alternative, the determination device may be a terminal such as a computer, a tablet or a cell phone.

The tracker TRAC has low energy consumption. It is powered by a battery with a limited voltage, for example less than 10 V. In the embodiment described here, the server SRV and the tracker TRAC communicate with one another via a LoRa network. The tracker TRAC is configured to take geographical location measurements Mj (j is a strictly positive integer) at times tj. These measurement times are for example spaced from one another, for example by 6 hours. The tracker TRAC is configured to send these measurements Mj to the server SRV.

The geographical location measurements are obtained with reference to a satellite system and are known by the term GNSS (for "Global Navigation Satellite System"). These are for example GPS or Galileo measurements or measurements from any other satellite system. There is no limit attached to the type of location measurement.

In one embodiment, the tracker TRAC comprises an accelerometer configured to detect an acceleration of movement of the tracker. The tracker TRAC is configured to increase the frequency of sending of the measurements Mj if the accelerometer detects an acceleration of movement of the tracker, the acceleration being an indication of a potential start of movement of the tracker. This involves for example sending a measurement every 30 minutes rather than every 6 hours in the absence of acceleration.

In order to save the energy of the tracker TRAC, the tracker may be configured to take a measurement for a shorter time than the time required for the measurement to stabilize. For example, rather than taking a measurement for a time of 1 to 3 minutes required for stabilization, the tracker TRAC takes a measurement for 5 to 6 seconds. The measurements Mj are therefore of uncertain reliability because they are not stabilized. The measurements Mj require post-processing by the server SRV in order to determine the positions and the movement of the tracker with greater precision.

Figure 2:
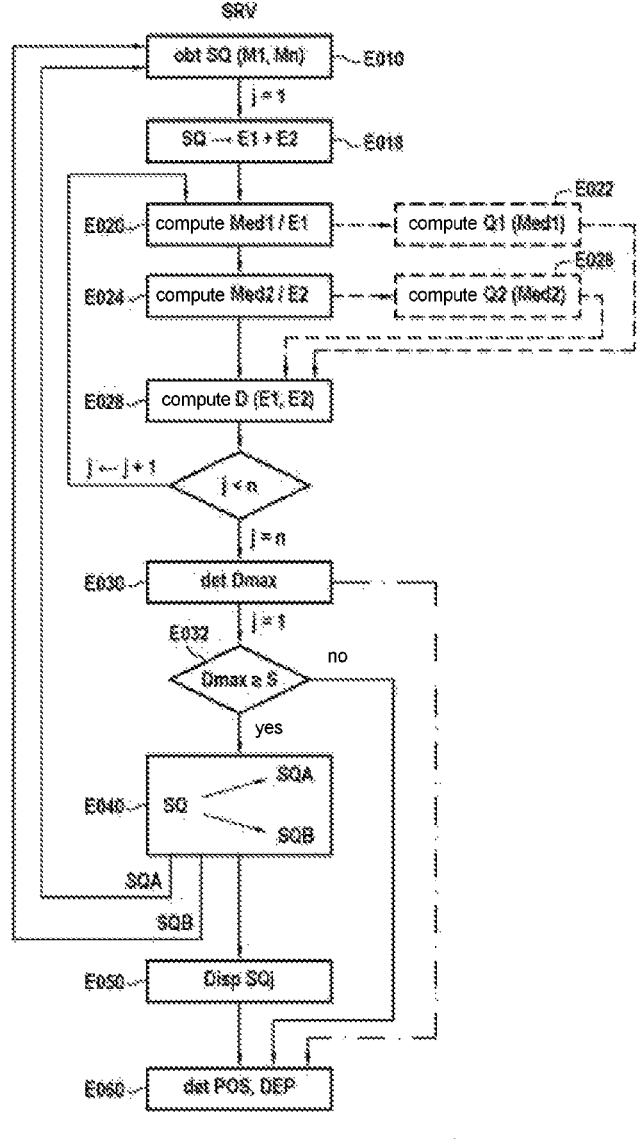
FIG. 2 is a flowchart showing steps of a method for determining geographical positions of a tracker according to one particular embodiment.

FIG. 2 is a flowchart showing the various steps of a method for determining geographical positions of a tracker in one particular embodiment. The method is implemented by the server SRV described with reference to FIG. 1.

In a step E010, the server SRV obtains a sequence SQ of measurements Mj of the geographical location of the tracker, the sequence SQ being ordered according to a measurement time of said measurements. The post-processing implemented by the server SRV is holistic, that is to say it is performed on the entire sequence SQ of the GNSS measurements Mj.

FIG. 3 illustrates the content of a memory of the server SRV according to the embodiment described with reference to FIGS. 1 and 2. The memory stores the sequence SQ obtained in step E010. The sequence SQ comprises a number n of measurements Mj. Optionally, the server SRV may obtain, in step E010, a measurement time tj for each measurement Mj, j being an integer that varies between 1 and n.

In a step E018, in a first iteration of the method, in which the first measurement M1 of the sequence SQ, called the "indexed measurement" here, is a reference measurement of the sequence of measurements under consideration, the server SRV partitions the sequence into two ordered sets E1 and E2. In this particular embodiment, the indexed measurement is the last measurement of the first set E1. In this first iteration, the first set E1 comprises the first measurement M1 of the sequence SQ and the second set E2 comprises the other measurements M2 to Mn of the sequence SQ.

In a step E020, the server SRV computes, for the indexed measurement M1, a statistical datum Med1 for the first set E1.

In a step E024, the server SRV computes, for the indexed measurement M1, a statistical datum Med2 for the second set E2.

The statistical data Med1 and Med2 are geographical positions determined based on the GNSS measurements of the sets E1 and E2, respectively. The statistical datum Med1 represents the measurements of the set E1, and the statistical datum Med2 represents the measurements of the set E2.

The statistical data Med1 and Med2 are of the same kind. In the embodiment described, the statistical data Med1 and Med2 are the geometric medians of the GNSS measurements of the sets E1 and E2, respectively: the statistical datum Med1 (respectively the statistical datum Med2) is a geographical position that minimizes the distances between itself and all of the GNSS measurements of the set E1 (respectively the set E2). To determine the geometric medians, a gradient descent technique, such as the one proposed by the mathematician Weiszfeld, may be used. The article "Generalized Weiszfeld Algorithms for Lq Optimization" by K. Aftab et al. published in the journal IEEE Transactions on Pattern Analysis and Machine Intelligence (Volume: 37, Issue: 4, Apr. 1, 2015) describes this technique. As an alternative, the statistical data Med1 and Med2 may be the means of the measurements of the sets E1 and E2, respectively.

In a step E028, the server SRV computes a distance D1, associated with the indexed measurement M1, between the two sets E1 and E2 on the basis of a distance between the statistical data Med1 and Med2 of these sets.

In the embodiment described here, the distance Dj between the two sets E1 and E2 associated with a measurement Mj is equal to the distance between their geometric medians Med1 and Med2.

The steps of partitioning into two sets E1 and E2 (step E018), of computing a statistical datum Med1, Med2 for each set E1, E2 (steps E020 and E024) and of computing a distance between the sets E1 and E2 (step E028) are repeated while varying the indexed measurement Mj from M2 to Mn of the sequence SQ, considering, each time, one indexed measurement Mj from among the measurements of the sequence SQ. In the embodiment described here, the indexed measurement Mj is the last measurement of the first set E1. As an alternative, it may be the first measurement of the second set E2.

The memory of the server SRV, illustrated by FIG. 3, also stores a table of distances Dj computed for all of the indexed measurements Mj of the sequence SQ, j varying from 1 to n. The memory of the server SRV also records, for each indexed measurement Mj, the sets E1 and E2 and the statistical data Med1 and Med2.

Following the implementation of steps E018, E020, E024 and E028 for all of the indexed measurements Mj of the sequence SQ, the server SRV determines, in a step E030, a maximum distance Dmax from among the distances Dj computed for all of the indexed measurements Mj of the sequence SQ. The server SRV determines, in a step E060, that the statistical datum Med1 of the first set E1 of the indexed measurement associated with the maximum distance Dmax corresponds to a first position of the tracker TRAC and that the statistical datum Med2 of the second set E2 of the indexed measurement associated with the maximum distance Dmax corresponds to a second position of the tracker TRAC.

In the embodiment described here, and for better precision, the server SRV compares, in a step E032, the maximum distance Dmax and a given threshold S. The threshold S may be a configuration datum for configuring the server SRV, or may be received by the server SRV from another communicating device. The threshold is for example chosen on the basis of the optimum precision of the tracker. By way of illustration, for a precision of one hundred meters, the threshold is chosen at twenty-five meters.

If the server SRV determined, in the comparison step E032, that the maximum distance Dmax is below the threshold S, the server SRV determines, in step E060, that the statistical datum of the first set of the indexed measurement associated with the maximum distance corresponds to a first position of the tracker and the statistical datum of the second set of the indexed measurement associated with said maximum distance corresponds to a second position of the tracker.

If the maximum distance Dmax is greater than or equal to the threshold S (E032), the server SRV divides, in a step E040, the sequence SQ into two subsequences SQA and SQB corresponding, respectively, to the first and second sets E1 and E2 of the indexed measurement Mj associated with the maximum distance Dmax. The server SRV then implements the method again, that is to say all of the steps E010 to E040 described above, for each of the subsequences SQA and SQB, as a sequence.

If the maximum distance Dmax has been obtained (E028) for multiple indexed measurements Mj, the server SRV arbitrarily chooses an indexed measurement from among these for the division (E040) of the sequence SQ.

The execution of the proposed method (steps E010 to E032) for one of the subsequences SQA or SQB may again lead to the division (E040) of one of these subsequences into two subsequences. The method is then implemented again for each of the new subsequences, as a sequence. The server SRV continually records the subsequences obtained at the end of each iteration of implementing the proposed method.

The proposed method is implemented until the maximum distances Dmax for all of the subsequences SQi are all below the threshold S.

If the server SRV verifies that all of the maximum distances Dmax for all of the sequences recorded in its memory are below the threshold, the server (SRV) determines, in step E060, the movements of the tracker and its positions before and after each movement.

The statistical data Med of the subsequences obtained at the end of the last iteration of implementing the method make it possible to determine the starting and finishing positions of the tracker during the movement thereof.

It will be assumed for example that, in a first iteration, the first sequence SQ has been divided (E040) into two subsequences SQA and SQB, and then that, in a second iteration, the subsequence SQA has been divided in turn (E040) into two subsequences SQAa and SQAb and that the subsequence SQB has not been divided, and that, in a third iteration, none of the subsequences SQAa and SQAb has been divided, the final number of subsequences obtained following the last iteration of implementing the method is three subsequences: SQAa, SQAb and SQB. The server SRV thus determines, in step E060, that the tracker has been moved twice:

a first movement between a position corresponding to the geometric median of the subsequence SQAa to a position corresponding to the geometric median of the subsequence SQAb, and then a second movement between a position corresponding to the geometric median of the subsequence SQAb to a position corresponding to the geometric median of the subsequence SQB.

The proposed method is based on a gradient descent technique. In each iteration, the server SRV defines subsequences so as to arrive at the subsequences for determining the starting and finishing positions during movement of the tracker.

In the embodiment described here, since the server SRV has obtained, in step E010, the measurement Mj times tj of the sequence SQ, the server SRV determines a time interval during which the tracker has been moved. Indeed, the server may compute a mean of the GNSS measurement Mj times tj of each of the subsequences SQAa, SQAb and SQB. The server SRV determines that the first movement of the tracker took place between a time (the mean) tAa computed for the subsequence SQAa and a time tAb computed for the subsequence SQAb. The second movement took place between the time tAb and a time tB computed for the subsequence SQB.

According to one variant of the first embodiment, the server SRV displays, on a map, in a step E050, a position corresponding to the geometric median (or other statistical datum) of each subsequence SQi. This display E050 may be performed as the method is implemented following each division E040, as shown in the flowchart of FIG. 2, or after the end of the iterations, that is to say after the determination step E060.

In a second embodiment, step E010 of obtaining a sequence SQ furthermore comprises obtaining reliability coefficients Qj at least for some measurements Mj of the sequence SQ. In particular, a measurement Mj may be weighted by a weighting coefficient, denoted wj and expressed by: [Math. 3]:

$$ w_j = e^{\frac{-Q_j}{K}} $$

where j is an integer (index) that varies between 1 and the number n of measurements of a sequence SQ, Qj is the reliability coefficient of a measurement Mj, and K is a constant, Qj and K being expressed in meters.

Indeed, the tracker TRAC takes a measurement Mj by picking up GNSS signals from multiple satellites. The tracker TRAC computes the solid angles between the various picked-up signals and assigns the reliability coefficient of the measurement Mj on the basis of the solid angles. If the satellites are aligned (solid angles tend toward 0), the measurement is of poor quality. On the contrary, if the satellites are in opposite directions to one another (for example at solid angles of 90° for 4 satellites), the measurement is of good quality.

According to this second embodiment, following step E020 of computing the statistical datum Med1 for the set E1 associated with an indexed measurement Mj, the server SRV computes, in a step E022, a quality coefficient CQ1 associated with the statistical datum Med1 of the set E1. This step E022 is shown in dashed lines in FIG. 2. The quality coefficient CQ1 is computed (E022) on the basis of the number of measurements of the set E1 and on the basis of the reliability coefficients Qj of the measurements Mj of the set E1.

Likewise, for the second set E2 associated with the indexed measurement Mj, the server SRV computes, in a step E026, a quality coefficient CQ2 associated with the statistical datum Med2 of the set E2. This step E026 is implemented after step E024, and is shown in dashed lines in FIG. 2. The quality coefficient CQ2 is computed (E022) on the basis of the number of measurements of the set E2 and on the basis of the reliability coefficients Qj of the measurements Mj of the set E2.

In this second embodiment, the server SRV computes (E028), for the indexed measurement Mj, the distance Dj between the first and second set E1 and E2, taking into account the quality coefficients CQ1 and CQ2 associated with their statistical data Med1 and Med2.

In particular, the quality coefficient CQ1 (or CQ2) of the statistical datum Med1 (or Med2) may be expressed by [Math. 4]:

$$ CQ = \sqrt{\frac{\sum_j Q_j^2 \times e^{-2Q_j/K}}{\left(\sum_j e^{-Q_j/K}\right)^2}} $$

where j is an integer (index) that varies between 1 and the number of measurements of the set E1 (respectively E2), Qj is the reliability coefficient of a measurement Mj, and K is a constant, Qj and K being expressed in meters.

The quality coefficient CQ of the statistical datum of a set may be considered to be a mean weighted on the basis of the number of measurements of the set and on the basis of the individual quality Qj of each measurement Mj.

Figure 4A:
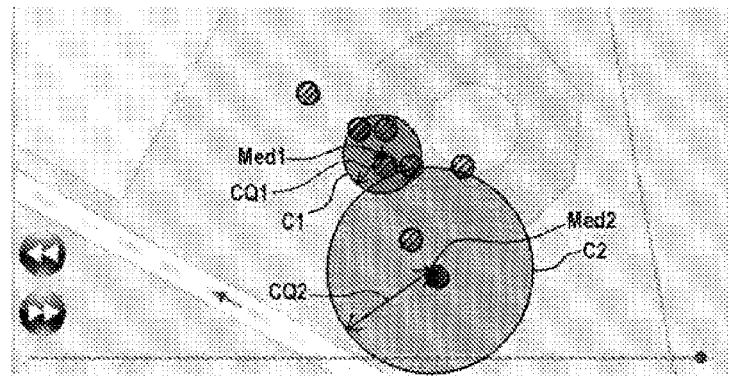
FIGS. 4A and 4B are maps displayed by a position determination device, according to one particular embodiment.
Figure 4B:
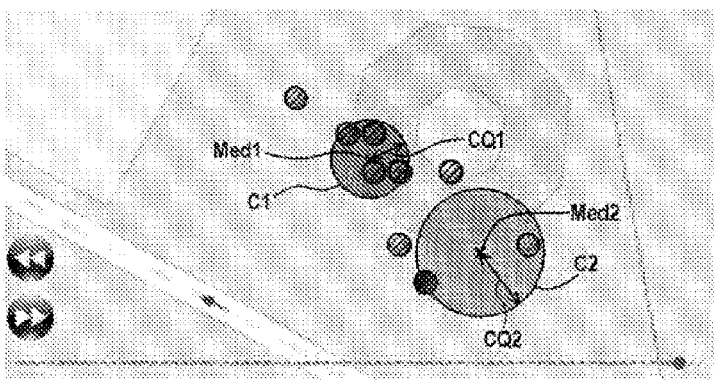

FIGS. 4A and 4B illustrate two examples of maps of the location measurements of the sensor, displayed by the server SRV according to this second embodiment of the invention. The various bubbles present on the maps represent measurements Mj of the GNSS geographical location of the tracker.

In this embodiment, the server SRV displays, for each set of measurements E1, E2, a circle C1, C2 whose center is the statistical datum Med1, Med2 of the set, and whose radius is determined on the basis of the quality coefficient CQ1, CQ2 associated with the statistical datum Med1, Med2. In this embodiment, the radius of the circle C1 (C2) is equal to the quality coefficient CQ1 (CQ2). The larger the radius of the circle, the less reliable the location. The indexed measurement is represented by the filled-in black bubble. The measurements of the first set E1, before the indexed measurement, are represented by hatched bubbles. The measurements of the second set E2, after the indexed measurement, are represented by dashed bubbles. In these examples, the indexed measurement is the first measurement of the second set E2.

FIG. 4A shows an example in which the first set E1 comprises 8 GNSS measurements, and the second set E2 comprises only one measurement, which is the indexed measurement. Since the quality coefficient depends on the number of measurements of the set, the quality coefficient CQ2 of the second set E2 is not as good as that (CQ1) of the first set E1. The radius of the circle C2 (8 meters in this example) is larger than that of the circle C1 (3 meters).

The radius of the circle C1, C2 is inversely proportional to the number of measurements of the set E1, E2. It is determined by an exponential sum function, for example.

Unlike the first embodiment, in which the distance D between the sets E1 and E2 is equal to the distance between the statistical data Med1 and Med2, in this second embodiment, the distance D is equal to the distance between the edges of the two circles C1 and C2: in other words, the distance between the statistical data Med1 and Med2, minus the quality coefficients CQ1 and CQ2 associated with each of the statistical data Med1 and Med2.

In the example of FIG. 4A, the circles overlap, and the distance Dj is equal to-1 meter. It is then not possible to determine a movement of the tracker.

In the example of FIG. 4B, the second set E2 comprises one more measurement compared to the example of FIG. 4A. The quality coefficient CQ2 is better and the circle C2 that represents it has a radius smaller than that of the example of FIG. 4A. It will be considered that the first set E1 of this example of FIG. 4B is identical to that of the example of FIG. 4A. The distance Dj between the two sets is equal to 3 meters.

It will be noted that the distance Dj between the edges of the circles is the distance taken into account to determine (E030) the maximum distance Dmax on which a potential division E040 is based. However, the movement distance of the tracker is represented by the distance between the statistical data Med1 and Med2, that is to say a movement of 10 meters in the example of FIG. 4A, and of 11 meters in the example of FIG. 4B.

Figure 5A:
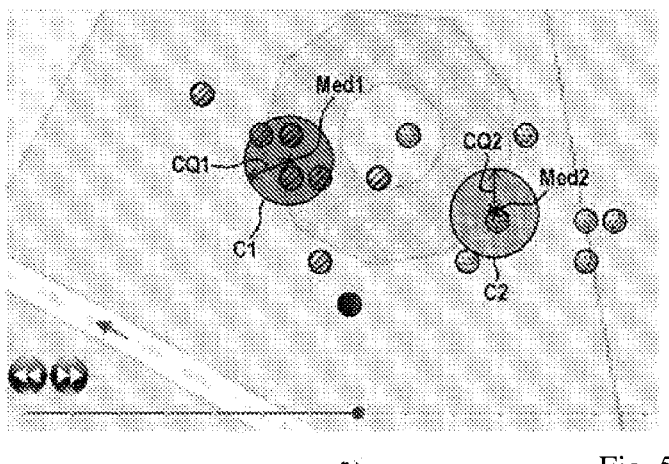
FIGS. 5A and 5B are maps displayed by a position determination device, according to one particular embodiment.
Figure 5B:
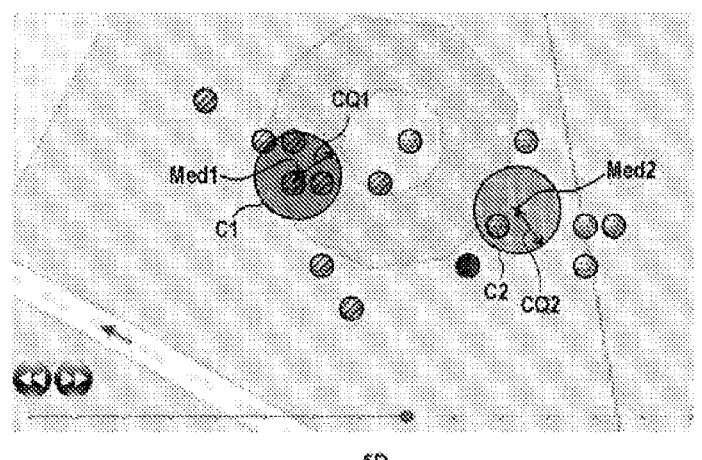

FIGS. 5A and 5B illustrate a map of measurements of the same sequence SQ displayed by the server SRV according to one particular embodiment, following implementations of steps E020 to E028 of the proposed method, considering two consecutive indexed measurements. The filled-in black bubble represents the indexed measurement, the hatched bubbles represent the measurements of the first set E1, and the dashed bubbles represent the measurements contained in the second set E2 in addition to the indexed measurement.

In the embodiment described here, the server SRV displays (E050) the map for each indexed measurement Mj after computation of the distance Dj associated with this measurement Mj.

For the indexed measurement of FIG. 5A, the first set E1 comprises 7 measurements, the second set E2 comprises 8 measurements, the distance between the statistical data Med1 and Med2 of the sets E1 and E2 is equal to 14 meters, the radii of the circles C1 and C2 are equal to 3 meters, and the distance D between the sets E1 and E2 is equal to 8 meters.

The indexed measurement of FIG. 5B follows, in the sequence SQ, that of FIG. 5A. For the indexed measurement of FIG. 5B, the first set E1 comprises 8 measurements, the second set E2 comprises 7 measurements, the distance between the statistical data Med1 and Med2 of the sets E1 and E2 is equal to 15 meters, the radii of the circles C1 and C2 are equal to 3 meters, and the distance D between the sets E1 and E2 is equal to 9 meters.

The indexed measurement of FIG. 5B makes it possible to obtain a distance D greater than that obtained by the indexed measurement of FIG. 5A.

It will be assumed that the server SRV determines, in step E030, that the maximum distance Dmax, equal to 9 meters, is associated with the indexed measurement of FIG. 5B, and determines, in step E032, that this distance Dmax is greater than the threshold S, the server SRV divides, in step E040, the sequence SQ into two subsequences corresponding to the sets E1 and E2 shown by FIG. 5B. According to this example, the server SRV determines that the tracker has been moved by 15 meters, from a geographical position corresponding to the statistical datum Med1 to a geographical position corresponding to the statistical datum Med2.

In one embodiment, the statistical datum Med1 or Med2 of a set E1 or E2 is weighted on the basis of the reliability coefficients Qj of the measurements Mj of this set, the weighted statistical datum being computed by applying Weiszfeld's algorithm. The statistical datum is thus closer to reliable GNSS measurements than to lower-quality GNSS measurements.

According to one variant applicable to the first or second embodiment described with reference to FIG. 2, the server SRV computes a mean of the times tj of some measurements of a subsequence that are closest to the geometric median Med of the subsequence. The server takes this mean into account to determine a time interval during which the tracker was moved.

According to another variant, the server SRV determines that a movement took place between the latest time from among the times in relation to the measurements of a first subsequence (for example the subsequence SQAa, or SQAb), and the earliest time from among the times in relation to the measurements of a second subsequence (for example the subsequence SQAb, or respectively SQB) that follows the first subsequence.

The use of a statistical datum such as the geometric median makes it possible to achieve a good location precision for the tracker when its movements are not of the same order of magnitude: short movements and longer movements.

In one embodiment, isolated GNSS measurements that are relatively spaced from the rest of the GNSS measurements of a set (with distances that exceed a certain threshold) are not taken into account to compute the statistical datum of this set.

In one embodiment, if a subsequence obtained after a division E040 comprises only a single measurement or a number of measurements below a certain threshold, this subsequence is not taken into account in step E060 of determining the movements of the tracker.

In one embodiment, when the determination device SRV receives a new measurement, it adds it to the last processed sequence and implements the method for the modified sequence. If the maximum distance Dmax increases following the addition of the new measurement, the device SRV compares the new value of the maximum distance Dmax with the threshold S and potentially divides the modified sequence into two subsequences.

Figure 6:
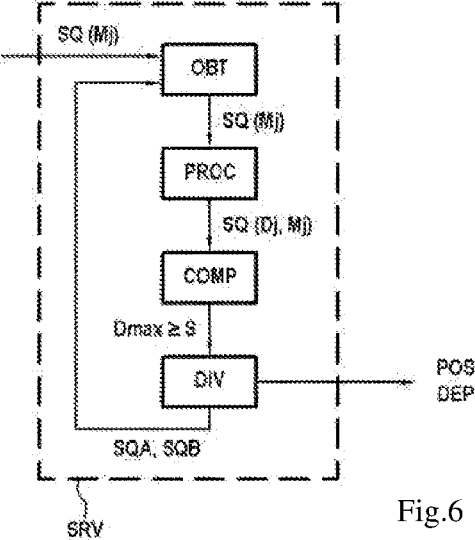
FIG. 6 illustrates a functional architecture of a device for determining geographical positions of a tracker according to one particular embodiment.

FIG. 6 shows a functional architecture, according to one embodiment of the invention, of a device for determining geographical positions of a geographical location tracker TRAC, such as the server SRV described with reference to FIGS. 1 to 5. The tracker TRAC may be collocated with an object, for example incorporated into it to track its GNSS location.

The device SRV comprises:

a module OBT for obtaining a sequence, configured to obtain a sequence SQ of measurements Mj of the geographical location of the tracker. It will be recalled that the sequence SQ is ordered according to a measurement time;

a processing module PROC configured:

for a measurement Mj of the sequence SQ, called indexed measurement, to partition (E018) all of the measurements into two ordered sets E1 and E2, the indexed measurement Mj being either the last measurement of the first set E1 or the first measurement of the second set E2;

to compute (E020) the statistical datum Med1 for the first set E1;

to compute (E024) the statistical datum Med2 for the second set E2, the data Med1 and Med2 being of the same kind, for example two geometric medians or two means;

to compute (E028) a distance Dj, associated with the indexed measurement Mj, between the sets E1 and E2 on the basis of a distance between the statistical data Med1 and Med2 of said sets;

a comparison module COMP configured to determine (E030) the maximum distance Dmax from among the distances computed for all of the indexed measurements Mj of the sequence SQ;

the processing module PROC determines (E060) that the statistical datum Med1 of the first set E1 of the indexed measurement associated with the maximum distance Dmax corresponds to a first position of said tracker and the statistical datum Med2 of the second set E2 of the indexed measurement associated with the maximum distance corresponds to a second position of the tracker TRAC.

In one embodiment, the comparison module COMP is furthermore configured to compare (E032) the maximum distance Dmax with the threshold S; the server SRV furthermore comprises a division module DIV configured, if the maximum distance Dmax is greater than or equal to said threshold S, to divide (E040) the sequence SQ into two subsequences SQA and SQB corresponding to the first and second sets E1 and E2 of the indexed measurement associated with the maximum distance Dmax; and send (E040) each of the subsequences SQA and SQB to the obtaining module OBT for a new iteration (E010 to E040) of implementing the determination method. The obtaining module OBT obtains each of the subsequences SQA and SQB as a sequence.

The statistical data of the subsequences obtained (E060) at the end of the last iteration correspond to the starting and finishing positions of the tracker following the movement thereof.

In one embodiment, the device SRV furthermore comprises a display module configured to display (E050), on a map, the statistical data Med of the subsequences SQA and SQB.

Figure 7:
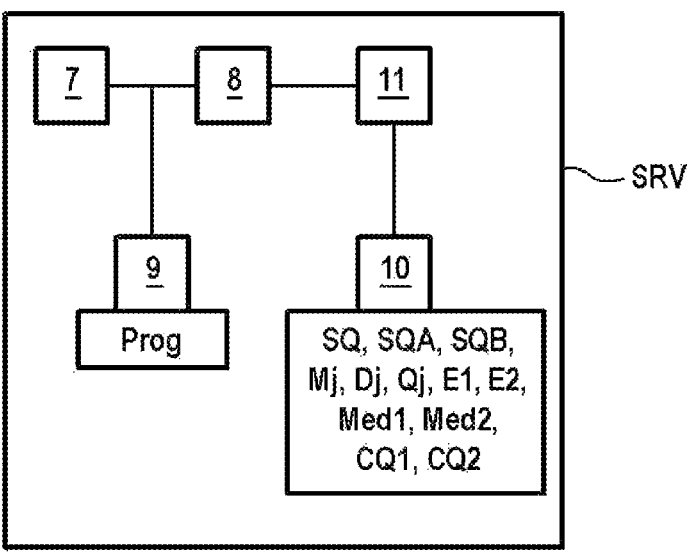
FIG. 7 illustrates the hardware architecture of a device for determining geographical positions of a tracker according to one particular embodiment.

In the embodiments described here, the device SRV has the architecture of a computer, as illustrated in FIG. 7. It comprises in particular a processor 7, a random access memory 8, a read-only memory 9 and a non-volatile flash memory 10 in one particular embodiment of the invention, along with communication means 11. Such means are known per se and are not described in more detail here.

The read-only memory 9 of the device SRV constitutes a recording medium according to the invention, able to be read by the processor 7 and on which there is recorded a computer program Prog as proposed.

The memory 10 of the server SRV makes it possible to record variables used to execute the steps of the method for determining positions of a sensor, such as the data illustrated by FIG. 3: the sequences SQ and subsequences SQA, SQB, the measurements Mj, the times tj at which they are taken, their reliability coefficients Qj, the sets E1 and E2 for each measurement Mj, the statistical data Med1, Med2, the quality coefficients CQ associated with the statistical data Med, the distances Dj, Dmax and the threshold S.

The computer program Prog defines functional and software modules, configured to determine geographical positions and possibly a movement of a tracker whose location is tracked by a tracker TRAC. These functional modules rely on and/or control the abovementioned hardware elements 7-11 of the device SRV.

The invention claimed is:

1. A method comprising:

determining geographical positions of a geographical location tracker, said determining being implemented by a device for a sequence of measurements of the geographical location of said tracker, said sequence being ordered according to a measurement time of said measurements, said determining comprising:

obtaining said sequence from said tracker;

for a measurement of said sequence, called an indexed measurement, partitioning all of said measurements into a first ordered set comprising said measurements having a measurement time that is prior to the indexed measurement and a second ordered set comprising said measurements having a measurement time that is after the indexed measurement, the indexed measurement being either the last measurement of the first set or the first measurement of the second set;

computing a statistical datum for said first set;

computing a statistical datum for said second set; and computing a distance, associated with said indexed measurement, between said sets on the basis of a distance between the statistical data of said sets; and determining a maximum distance from among the distances computed for all of the indexed measurements of said sequence, the statistical datum of the first set defined for the indexed measurement associated with said maximum distance corresponding to a first position of said tracker and the statistical datum of the second set defined for the indexed measurement associated with said maximum distance corresponding to a second position of said tracker, wherein:

the tracker includes an accelerometer; and a frequency at which the measurements of the sequence are obtained from said tracker increases upon detection of an activation of the accelerometer.

2. The method as claimed in claim 1, furthermore comprising:

comparing the maximum distance and a threshold; and if the maximum distance is greater than or equal to said threshold, dividing said sequence into two subsequences corresponding to the first and second sets of the indexed measurement associated with said maximum distance; and implementing the method for each of said subsequences as a sequence.

3. The method as claimed in claim 1, wherein said statistical data are geometric medians for said sets.

4. The method as claimed in claim 1, wherein:

said obtaining furthermore comprises obtaining reliability coefficients for at least some measurements of said sequence; and said method furthermore comprising, for each indexed measurement of said sequence, and for each of said first and second sets, computing a quality coefficient associated with the statistical datum of the set, on the basis of the number of measurements of the set and on the basis of the reliability coefficients of the measurements of the set, said distance between said first and second sets being computed taking into account said quality coefficients associated with their statistical data, where j is an integer varying from 1 to the number n of measurements of the set.

5. The method as claimed in claim 4, wherein the quality coefficient of a said statistical datum of a set is expressed by:

$$CQ = \sqrt{\frac{\sum_j Q_j^2 \times e^{-2Q_j/K}}{\left(\sum_j e^{-Q_j/K}\right)^2}}$$

where j is the integer varying from 1 to the number n of measurements of the set, Qj is the reliability coefficient of the measurement Mj of said set, and K is a constant, Qj and K being expressed in meters.

6. The method as claimed in claim 4, wherein the statistical datum of said set is weighted on the basis of the reliability coefficients of the measurements of this set, the weighted statistical datum being computed by applying Weiszfeld's algorithm.

7. The method as claimed in claim 4, wherein the distance between said first and said second set is equal to the distance between the statistical data of these sets, minus the quality coefficients associated with each of said statistical data.

8. The method as claimed in claim 4, furthermore comprising displaying, on a map, a circle whose center is the statistical datum of said set, and whose radius is the quality coefficient associated with the statistical datum.

9. The method as claimed in claim 1, wherein said measurements of said sequence are timestamped in order to determine a time interval during which said tracker has been moved.

10. A non-transitory computer readable medium comprising a computer program recorded thereon comprising instructions which when executed by a processor of a device configure the device to implement a method of determining geographical positions of a geographical location tracker for a sequence of measurements of the geographical location of said tracker, said sequence being ordered according to a measurement time of said measurements, said method comprising:

obtaining said sequence from said tracker;
for a measurement of said sequence, called indexed measurement,
partitioning all of said measurements into a first ordered set comprising said measurements having a measurement time that is prior to the indexed measurement and a second ordered set comprising said measurements having a measurement time that is after the indexed measurement, the indexed measurement being either the last measurement of the first set or the first measurement of the second set;
computing a statistical datum for said second set; and
computing a distance, associated with said indexed measurement, between said sets on the basis of a distance between the statistical data of said sets; and
determining a maximum distance from among the distances computed for all of the indexed measurements of said sequence; the statistical datum of the first set defined for the indexed measurement associated with said maximum distance corresponding to a first position of said tracker and the statistical datum of the second set defined for the indexed measurement associated with said maximum distance corresponding to a second position of said tracker,
wherein:
the tracker includes an accelerometer; and
a frequency at which the measurements of the sequence are obtained from said tracker increases upon detection of an activation of the accelerometer.

11. A device for determining geographical positions of a geographical location tracker, said device comprising:
a processor; and
a non-transitory computer readable medium comprising a computer program recorded thereon comprising instructions which when executed by the processor configure the device to implement a method comprising:

obtaining a sequence of measurements of the geographical location of said tracker from said tracker, said sequence being ordered according to a measurement time of said measurements;
for a measurement of said sequence, called indexed measurement,
partitioning all of said measurements into a first ordered set comprising said measurements having a measurement time that is prior to the indexed measurement and a second ordered set comprising said measurements having a measurement time that is after the indexed measurement, the indexed measurement being either the last measurement of the first set or the first measurement of the second set;
computing a statistical datum for said first set;
computing a statistical datum for said second set; and
computing a distance, associated with said indexed measurement, between said sets on the basis of a distance between the statistical data of said sets;
determining a maximum distance from among the distances computed for all of the indexed measurements of said sequence; and
determining that the statistical datum of the first set defined for the indexed measurement associated with said maximum distance corresponds to a first position of said tracker and that the statistical datum of the second set defined for the indexed measurement associated with said maximum distance corresponds to a second position of said tracker,
wherein:
the tracker includes an accelerometer; and
a frequency at which the measurements of the sequence are obtained from said tracker increases upon detection of an activation of the accelerometer.

12. The device as claimed in claim 11, wherein the instructions further configure the device to:
compare the maximum distance with a threshold; and
in response to the maximum distance being greater than or equal to said threshold,
divide said sequence into two subsequences corresponding to the first and second sets of the indexed measurement associated with said maximum distance; and
send each of said subsequences to an obtaining module so that the obtaining module obtains them as sequences.

13. A system for determining geographical positions of a geographical location tracker, said system comprising:
a device for determining geographical positions of the geographical location tracker, said device comprising:
a processor; and
a non-transitory computer readable medium comprising a computer program recorded thereon comprising instructions which when executed by the processor configure the device to implement a method comprising:
obtaining a sequence of measurements of the geographical location of said tracker, said sequence being ordered according to a measurement time of said measurements;
for a measurement of said sequence, called indexed measurement,
partitioning all of said measurements into a first ordered set comprising said measurements having a measurement time that is prior to the indexed measurement and a second ordered set comprising said measurements having a measurement time that is after the indexed measurement, the indexed measurement being either the last measurement of the first set or the first measurement of the second set;

computing a statistical datum for said first set;

computing a statistical datum for said second set; and computing a distance, associated with said indexed measurement, between said sets on the basis of a distance between the statistical data of said sets;

determining a maximum distance from among the distances computed for all of the indexed measurements of said sequence; and determining that the statistical datum of the first set defined for the indexed measurement associated with said maximum distance corresponds to a first position of said tracker and that the statistical datum of the second set defined for the indexed measurement associated with said maximum distance corresponds to a second position of said tracker, wherein:

the geographical location tracker is configured to send the measurements to the device;

said tracker comprises an accelerometer; and said tracker is configured to increase a frequency of sending said measurements upon detection of an activation of the accelerometer.

\* \* \* \* \*